United States Patent [19]

Shibano et al.

[11] Patent Number: 4,983,984
[45] Date of Patent: Jan. 8, 1991

[54] ROADSIDE BEACON SYSTEM WITH POLARIZED BEAMS

[75] Inventors: Yoshizo Shibano; Haruo Suzuki; Tohru Iwai, all of Osaka, Japan

[73] Assignee: Sumitomo Electric Industries, Ltd., Osaka, Japan

[21] Appl. No.: 125,665

[22] Filed: Nov. 25, 1987

[30] Foreign Application Priority Data

Nov. 27, 1986 [JP] Japan .................. 61-282631

[51] Int. Cl.$^5$ .............................. H01Q 1/32
[52] U.S. Cl. .................. 343/711; 343/713; 342/457
[58] Field of Search ........... 343/853, 711, 713, 793; 455/55, 129; 342/457; 340/988

[56] References Cited

U.S. PATENT DOCUMENTS

| | | | |
|---|---|---|---|
| 2,904,674 | 9/1959 | Crawford | 343/711 |
| 3,423,681 | 1/1969 | McKenna | 343/841 |
| 3,702,479 | 11/1972 | Uhrig | 343/853 |
| 3,735,335 | 5/1973 | Kaplan et al. | 342/457 |

FOREIGN PATENT DOCUMENTS

| | | | |
|---|---|---|---|
| 3346899 | 7/1985 | Fed. Rep. of Germany | 343/711 |
| 41031 | 3/1980 | Japan | 455/55 |
| 47743 | 4/1980 | Japan | 455/55 |
| 57306 | 5/1981 | Japan | 343/711 |

OTHER PUBLICATIONS

Johnson et al., Antenna Engineering Handbook, published by McGraw-Hill Book Company, New York, N.Y., 2nd Edition, 1984, pp. 15-1 to 15-13.

Primary Examiner—Michael C. Wimer
Attorney, Agent, or Firm—Sughrue, Mion, Zinn, Macpeak & Seas

[57] ABSTRACT

In a roadside beacon system for transmitting to vehicles moving along roads, signals on position and direction, linearly polarizing antennas mounted to be stationarey either beside or above the roads and other linearly polarizing antennas mounted to be mobile on the vehicles. The downwardly transmitting stationary and the upwardly receiving mobile antennas have matching linear polarizations when the vehicle is traveling on the road adjacent to the antenna but a mobile antenna will have reduced sensitivity when moving on a road at a different angle.

2 Claims, 4 Drawing Sheets

ROADSIDE BEACON SYSTEM WITH POLARIZED BEAMS

DETAILED DESCRIPTION OF THE INVENTION

1. Field of the Invention

This invention relates to roadside beacon systems. More particularly, it relates to a roadside beacon system suitable for calibration of the position of a vehicle in a navigation system in which data are transmitted between roadside antennas permanently installed along roads and vehicles traveling along the roads to display the current positions of the vehicles.

2. Background of the Invention

A so-called "navigation system" is well known in the art in which a small computer and a display unit are installed on a vehicle. A road map stored in a memory such as a compact disk is displayed on the display unit. According to the results of the determination, a mark representing the current position of the vehicle is indicated at the proper position in the road map displayed on the display unit.

The navigation system allows the driver of the vehicle to visually detect the current position and traveling direction of the vehicle. Therefore, he can drive his vehicle with assurance to the destination without losing his way.

However, the navigation system is disadvantageous in the following point. Errors inherent in the vehicle speed sensor and the direction sensor are accumulated with the increasing movement of the vehicle. If the travel distance of the vehicle reaches a certain distance, the position of the vehicle displayed on the display unit greatly deviates form the true position. This certain distance is not always constant since it is determined from the degrees of errors of the vehicle speed sensor and the direction sensor and the variations of the environmental conditions at the positions of the sensors. That is, in this case, the navigation system is not reliable and the driver may lose his way.

For the purpose of eliminating the above-described difficulty, a so-called "roadside beacon system" has been proposed in the art. In the roadside beacon system, roadside antenna are installed along roads at predetermined intervals shorter than the distances at which the errors accumulate to the predetermined values. Each of the roadside antennas radiates a signal containing position data and road direction data. The signal thus radiated is applied to the computer on the vehicle through a mobile antenna installed on the vehicle so that the position and the travel direction of the vehicle are corrected according to the signal thus received.

In the roadside beacon system, the accumulations of the errors are at all times smaller than those obtained after the certain discalibration distances. Therefore, the display is made on the basis of correct position and direction data with high accuracy. This will permit the navigation system to fulfill its original function. Another advantage of the roadside beacon system is that, if a roadside antenna is installed at a position, such as near a railroad or railroad crossing, where the direction sensor is liable to provide a relatively large error, the occurrence of errors due to external factors can be effectively calibrated.

There are, however, problems with the above-described roadside beacon system. Each of the roadside antennas of considerably high directivity radiates a signal containing position data and road direction data at all time. The signal thus radiated is received by a vehicle only when the vehicle passes through the area covered by the signal so that the necessary calibrations are carried out according to the signal thus received. Accordingly, if the area covered by the signal is increased, then the deviation of the signal receiving position from the position of the roadside antenna is increased. As a result, the necessary calibrations cannot be sufficiently achieved.

The fundamental function of the roadside beacon system is to apply signals to vehicles equipped with the navigation system. However, it is desirable for the effective use of the roadside beacon system to add the following functions.

(1) Traffic information on the traffic congestion, construction and use of roads around a roadside antenna is applied to the navigation system on a vehicle so that the vehicle can smoothly travel.

(2) Map data including houses with names around a roadside antenna are added so that the vehicle can reach the destination with ease.

(3) Data on a larger road map including the roadside antenna are given to the navigation system to renew the road map displayed on the display unit so that the vehicle can smoothly reach a destination far away.

For these purposes, it is essential to increase not only the transmission frequency band of a signal radiated through a roadside antenna but also the area covered by the signal in order to allow for the transmission of increased information.

However, if the transmission frequency band of the signal and the area covered by the signal are increased as was described above, then the position at which the signal is received greatly deviates from the position of the roadside antenna. Because of this deviation, the calibration of the vehicle position, which is the original function of the system, cannot be accurately achieved.

On the other hand, it has been strongly required to practice the following method. Data transmitted from a number of vehicles are received through roadside antennas, in order to detect traffic congestion of roads or accidents on them. The data thus received are analyzed and consolidated. The resultant analyzed data are radiated through the roadside antenna. Alternatively, particular data are transmitted between vehicles and a roadside control device. In this case also, the transmitted data suffer increased error rate since they are adversely affected by the multi-path fading which is caused by buildings along the road or other nearby vehicles.

In general, the roadside antenna is installed near a road. However, in the case where a structure extends over a road as in a two-level crossing or a pedestrian overpass, the roadside antenna may be secured to the lower portion of the structure. In this case, the mounting means, such as a pole, of the roadside antenna can be simplified.

The major lobe of the mobile antenna installed on a vehicle is substantially horizontal in order to effectively receive radio waves from roadside antennas installed along roads. Therefore, even if radio waves are transmitted through the roadside antenna secured to the lower portion of the structure extending over a road, they can be scarcely received by the mobile antenna.

Roads include two-level crossings. Sometimes it is necessary to install roadside antennas at the two-level crossings as illustrated in FIG. 1.

In this case, an antenna supporting pole 21 is installed adjacent to a road 8. An antenna 22 is mounted on the pole 21 in such a manner that it is directed obliquely downwardly so that it can radiate a radio wave at a signal strength higher than a certain level over a predetermined area.

Therefore, in this case, the radio wave transmitted through the roadside antenna 22 installed adjacent to an overpass 8u leaks out to the area of an underpass 8d so that it is received by a vehicle traveling through the underpass 8d with the result that the vehicle position is erroneously calibrated. In other words, although the overpass 8u is completely different from the underpass 8d in direction and in traffic information, the vehicle running through the underpass 8d receives signals from the roadside antenna 22 installed on the overpass 8u to renew the navigation data. Thus, in this case, the navigation system of the vehicle on the underpass is unreliable.

This difficulty may be overcome by increasing the directivity of the roadside antenna 22 so that the strength of the radio wave leaking out to the underpass 8d is minimized. However, this method provides another difficulty. That is, in order to increase the directivity of the roadside antenna, it is necessary to stack antenna elements in a plane in the widthwise direction of the road, and therefore the resultant road antenna 22 is bulky and high in manufacturing cost. In forming the roadside antenna by stacking antenna elements as described above, it goes without saying that its practical dimensions are limited, with the results that it is difficult to sufficiently increase the directivity of the antenna. That is, the leakage of the radio wave cannot be completely prevented.

SUMMARY OF THE INVENTION

In view of the foregoing, an object of this invention is to provide a roadside beacon system in which, at a position where a structure extends over a road, the installation of a roadside antenna is simplified, and no matter where a roadside antenna is installed, data are positively transmitted and received.

The foregoing object of the invention has been achieved by the provision of roadside beacon systems according to first and second aspects of the invention.

In both aspects of the invention, the roadside antenna transmits a linearly polarized beam and the mobile antenna traveling on the road intended for reception preferentially receives the beam so linearly polarized with greater gain than a beam linearly polarized at a right angle thereto. A vehicle with such an antenna traveling on a perpendicular road has a reduced sensitivity to the so polarized beam. The choice of polarization in the roadside antenna depends on whether the roadside antenna is mounted at the side of the road or is mounted overhead.

In the first aspect of the invention, the linear polarization extends across the width of the road while, in the second aspect of the invention, the linear polarization extends along the length of the road.

DETAILED DESCRIPTION OF THE PREFERRED EMBODIMENTS

Figure 2:
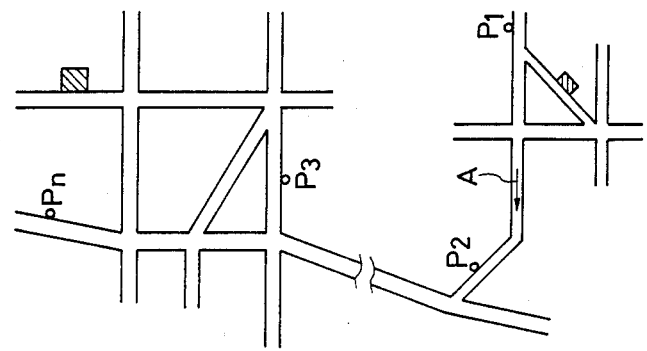
FIG. 2 is an explanatory diagram showing one example of a road map displayed on a display unit.

In the beacon systems according to the first aspect of the invention, roadside antennas are installed at predetermined positions along roads in different configurations depending on their position. Where the roadside antenna is mounted at a position where a structure extends over a road, it is mounted on the lower portion of the structure to transmit and receive in a downward direction a radio wave polarized in the widthwise direction of the road. Where the roadside antenna is mounted at a position where no structure extends over a road, it is installed near the road to transmit and receive a vertically polarized radio wave in an obliquely downwardly direction. Each of the mobile antennas installed on vehicles traveling along the roads transmits and receives a horizontally polarized radio wave in a direction of travel of the vehicle, a vertically polarized radio wave in a direction perpendicular to the direction of travel of the vehicle, and a radio wave polarized in the widthwise direction of the vehicle in an upward direction of the vehicle.

In the roadside beacon system according to the second aspect of the invention, roadside antennas are likewise installed at predetermined positions along roads in different configurations depending on the positions. Where the roadside antenna is installed at a position where a structure extends over a road, it is mounted on the lower portion of the structure to transmit and receive in a downward direction a radio wave polarized in the lengthwise direction of the road. Where it is installed at a position where no structure extends over a road, it is installed near the road to transmit and receive a horizontally polarized radio wave in an obliquely downward direction. Each of the mobile antennas installed on vehicles traveling along the roads transmits and receives a horizontally polarized radio wave in a direction perpendicular to the direction of travel of the vehicle, a vertically polarized radio wave in the direction of travel of the vehicle, and a radio wave polarized in the direction of travel of the vehicle in an upward direction of the vehicle.

In the case in the roadside beacon system according to the first aspect of the invention, data are transmitted between any one of the roadside antennas installed at the predetermined positions along the roads and the mobile antenna installed on a vehicle traveling along the roads. According to this first aspect, the roadside antenna mounted on the lower portion of the structure extending over the road transmits and receives in the downward direction the radio wave polarized in the widthwise direction of the road, while the mobile antenna can transmit and receive the radio wave polarized in the widthwise direction of the vehicle in the upward direction of the vehicle, as was described above. Thus, in the radio beacon system, necessary data can be transmitted between the roadside antenna and the mobile antenna.

Furthermore, as was described above, the roadside antenna installed near the road transmits and receives the vertically polarized radio wave in the obliquely downwardly direction, while the mobile antenna can transmit and receive the vertically polarized radio wave in the direction perpendicular to the direction of travel of the vehicle. Thus, in this case also, necessary data can be transmitted between the roadside antenna and the mobile antenna.

At a two-level crossing, the roadside antenna installed near the overpass transmits and receives the vertically polarized radio wave, while the mobile antenna on the vehicle on the other level transmits and receives only horizontally polarized radio waves in the direction of travel of the vehicle. Therefore, no data are transmitted between the roadside antenna and the mobile antenna.

In the case of the roadside beacon system according to the second aspect of the invention, data are transmitted between any one of the roadside antennas installed at predetermined position along the roads and the mobile antenna installed on a vehicle traveling along the roads. The roadside antenna mounted on the lower portion of the structure extending over a road transmits and receives in the downward direction the radio wave polarized in the lengthwise direction of the road while the mobile antenna transmits and receives in the upward direction the radio wave polarized in the longitudinal direction of the vehicle, as was described above. Thus, necessary data can be transmitted between the roadside antenna and the mobile antenna.

Furthermore, as was described above, the roadside antenna installed near a road transmits and receives the horizontally polarized radio waves in the obliquely downward direction, while the mobile antenna transmits and receives the horizontally polarized radio wave in the direction perpendicular to the direction of travel of the vehicle. Therefore, in this case also, necessary data can be transmitted between the roadside antenna and the mobile antenna.

At a two-level crossing, the roadside antenna installed near the overpass transmits and receives the horizontally polarized radio wave, while the mobile antenna on a vehicle traveling on the other level transmits and receives the vertically polarized radio wave in the direction of travel of the vehicle. Therefore, in this case, no data are transmitted between the roadside antenna and the mobile antenna.

Preferred embodiments of this invention will be described with reference to the accompanying drawings.

FIG. 2 is a diagram outlining one example of a road map which is displayed on a display unit. In FIG. 2, the present position and traveling direction of a vehicle are indicated by the arrow A. Roadside antennas $P_1, P_2 \ldots$ and $P_n$ are displayed in correspondence to their actual positions. These roadside antennas $P_1$ through P need not be displayed. In addition, buildings, etc. (not shown) are indicated.

Figure 3:
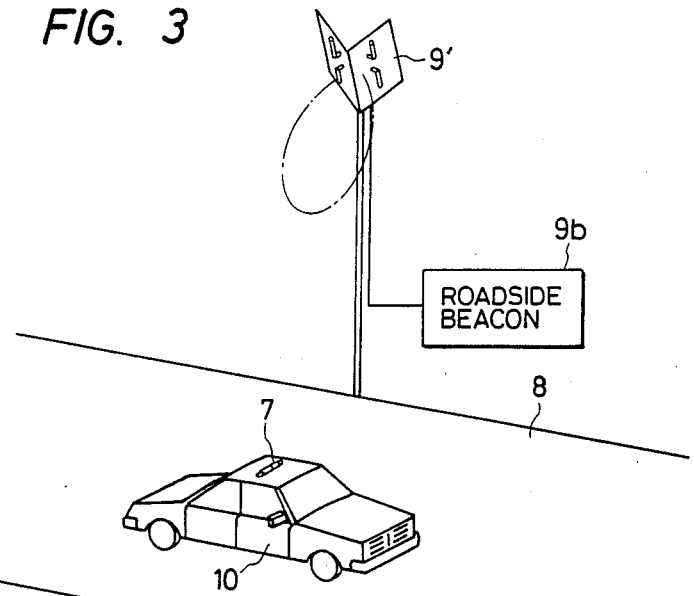
FIGS. 3 and 5 are a perspective view and a vertical view outlining relationships between a roadside antenna installed along a road and a mobile antenna, respectively.
Figure 4:
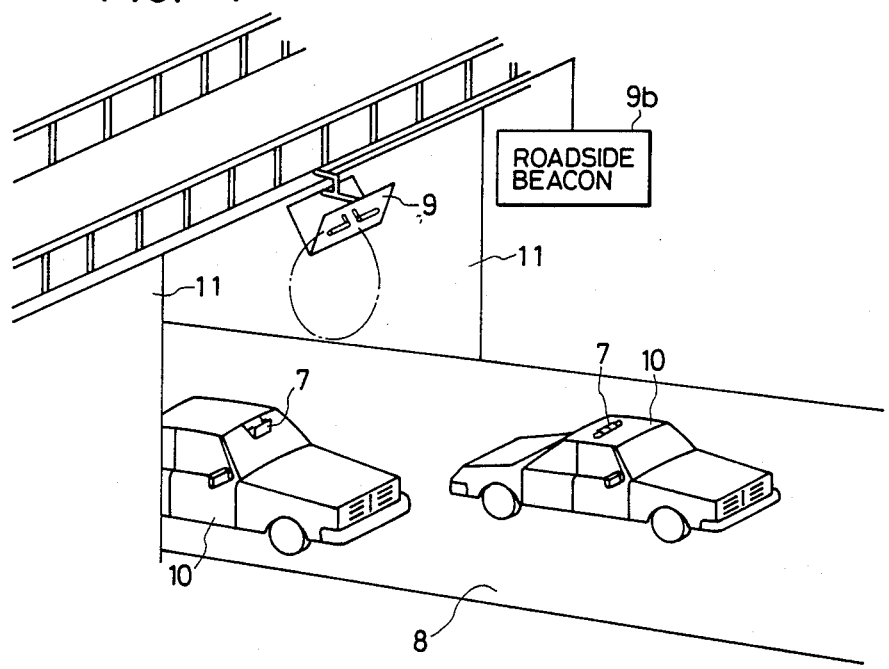
FIGS. 4 and 6 are perspective view and a vertical view outlining relationships between a roadside antenna and mobile antennas in one embodiment of this invention.

FIGS. 3 and 4 are explanatory diagrams for a description of a roadside beacon system. As shown in FIG. 3, a roadside antenna 9' which transmits signals is installed adjacent to a road 8. A roadside beacon transmitter and receiver 9b supplies the antenna 9' with the radio signals and, as will be described later, can also receive data from the vehicle 10 through the antenna 9'. A mobile antenna 7 is installed at a predetermined position on a vehicle 10 which travels along the road 8. The mobile antenna 7 is used to receive the signal transmitted through the roadside antenna 9'. The signal received by the mobile antenna 7 is applied to a navigation device (not shown) in the vehicle 10. As shown in FIG. 4, at a location where a structure 11 such as a pedestrian overpass extends over a road 8, a roadside antenna 9 is connected to the lower portion of the structure 11.

Figure 5:
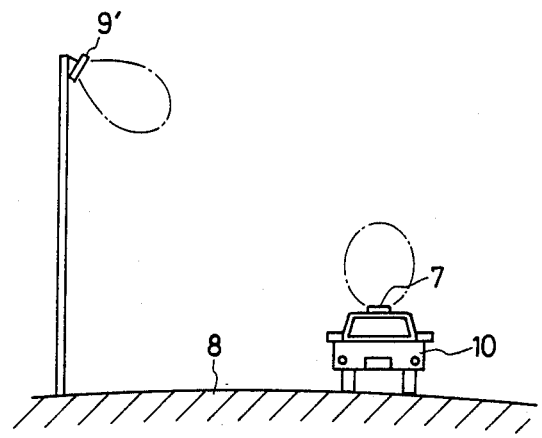
Figure 6:
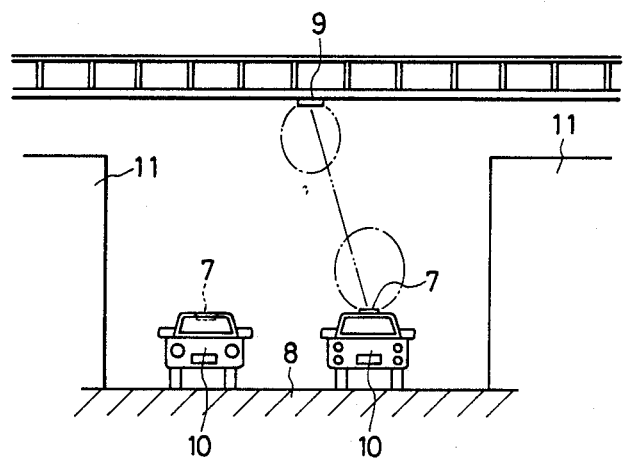

As shown in FIG. 5, the major lobe of the side mounted roadside antenna 9' extends slightly obliquely downwardly. On the other hand, the main lobe of the roadside antenna 9 attached to the overhead structure extends downwardly as shown in FIG. 6. The main lobe of the mobile antenna 7 extends upwardly in any case as shown in FIG. 6.

In the case where the radio wave transmitted and received by the overhead mounted roadside antenna 9 is polarized in the widthwise direction of the road 8 and the radio wave transmitted and received by the side mounted roadside antenna 9' is polarized vertically, the mobile antenna 7 should be able to transmit and receive in the widthwise direction of the vehicle a vertically polarized radio wave and to transmit in the upward direction of the vehicle a radio wave polarized in the widthwise direction of the vehicle. It should also be able to transmit and receive in the direction of movement of the vehicle a horizontally polarized radio wave. In this case, necessary data can be transmitted between the mobile antenna and any one of the roadside antennas.

One example of the mobile antenna 7 having the above-described characteristic, as shown in FIG. 4, comprises a plane reflector bent at a predetermined angle, and a dipole antenna installed along the bending line of the plane reflector. The mobile antenna is installed on the vehicle in such a manner that it extends in the widthwise direction of the vehicle. In another example of the mobile antenna 7, a pair of antenna boards which are parallel to a ground plane, are connected to a short-circuit board to the ground plane, and transmitted signals 180° out of phase are supplied to positions which are symmetrical with respect to the short-circuit board. For reception, the two received signals at these positions are phase shifted by 180° relative to each other. The mobile antenna is installed on the vehicle 10 in such a manner that the two feeding points are arranged in the widthwise direction of the vehicle.

Figure 7:
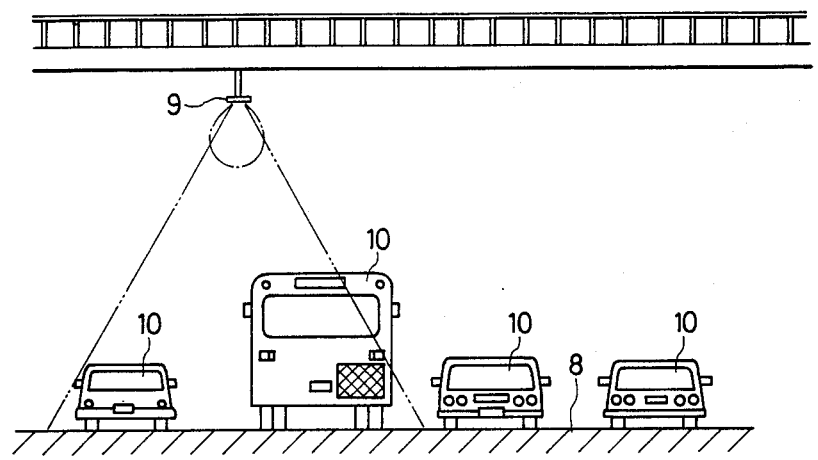
FIG. 7 is a vertical view for a description of the case where only a selected vehicle path is covered by radio waves transmitted through the roadside antenna.

In the case when radio waves are transmitted between the overhead roadside antenna 9 and the mobile antenna 7, the overhead roadside antenna 9 can directly see the mobile antenna 7. Therefore, in this case, like the case of FIG. 5 where radio waves are transmitted between the side mounted roadside antenna 9' and the mobile antenna 7, multi-path fading can be positively prevented. Furthermore, when the directivity of the roadside antenna 9 is so determined that the antenna 9 covers a predetermined lane only as shown in FIG. 7, then transmission between the overhead roadside antenna 9 and the mobile antennas 7 of other vehicles can be positively prevented.

Figure 1:
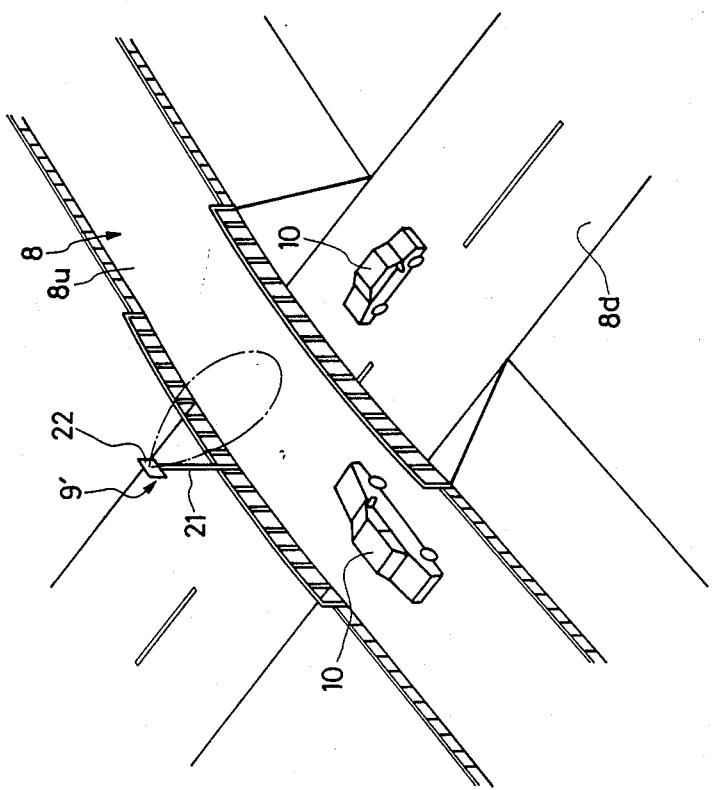
FIG. 1 is a perspective view outlining a two-level crossing in a traffic network.

When, in the case where at a two-level crossing the side mounted roadside antenna 9' installed adjacent to the overpass 8u transmits a vertically polarized radio wave downwardly as shown in FIG. 1, a vehicle 10 running over the overpass 8u approaches the roadside antenna 9' in a direction such that the mobile antenna 7 will receive the vertically polarized radio wave in the widthwise direction of the vehicle. Thus, the radio wave transmitted through the roadside antenna 9' is received with high sensitivity and the navigation data can be therefore calibrated.

At the same time, at the two-level crossing the radio wave transmitted through the roadside antenna 9' leaks out to the vehicle running perpendicularly beneath the underpass 8d. However, in this case, the mobile antenna 7 of the vehicle is so positioned as to mainly receive a horizontally polarized radio wave. That is, the mobile antenna 7 of the vehicle 10 running through the underpass 8u receives the vertically polarized radio wave with extremely low sensitivity, and therefore the signal from the roadside antenna will not be received by the mobile antenna. Thus, in this case, the navigation of the vehicle is continued according to the navigation data provided previously.

Figure 8:
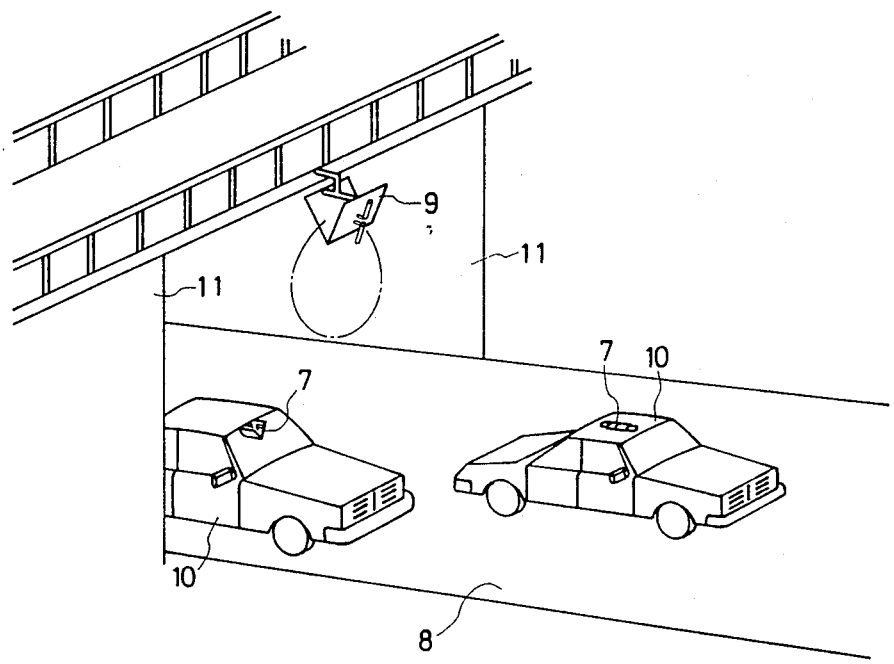
FIG. 8 is a perspective view showing another embodiment of the invention.

FIG. 8 is a diagram outlining another embodiment of the invention. The embodiment of FIG. 8 is different from that of FIGS. 1 and 4 in the following points. The radio wave transmitted and received by the overhead roadside antenna 9 is polarized in the lengthwise direction of the road 8 and the radio wave transmitted and received by the side mounted roadside antenna 9' is horizontally polarized. In addition, the mobile antenna 7 can transmit and receive a horizontally polarized radio wave from the widthwise direction of the vehicle and a radio wave polarized longitudinally of the vehicle in the upward direction of the vehicle. Further, it can transmit and receive a vertically polarized radio wave in the direction of travel of the vehicle. The mobile antenna 7 is the same in construction as that shown in FIG. 6. However, it should be noted that the direction of the mobile antenna 7 on the vehicle 10 in FIG. 8 is different by 90° from that of the mobile antenna on the vehicle in FIG. 4.

In the second embodiment, similarly as in the first embodiment, radio waves can be transmitted between the mobile antenna and any one of the roadside antennas. Transmission and reception of signals between the mobile antenna of the vehicle on one road and the roadside antenna installed for other roads can be positively prevented.

In the above-described embodiment, the mobile antenna 7 may be installed on the roof of the vehicle. However, the mobile antenna may be installed inside the vehicle in such a manner that it is adjacent to the edge of the roof and its interference with radio waves scattered form the edge of the roof is greatly suppressed. In this case, the mobile antenna is completely free from weather conditions such as for instance rain and the signal feed structure can be simplified.

As is apparent from the above description, according to the invention, both in the case where a roadside antenna is installed near a roadside and in the case where it is connected at the lower portion of a structure extending over a road, radio waves can be transmitted between the roadside antenna and the mobile antenna on a vehicle, and transmission and reception of signals between the mobile antenna of a vehicle on a road and the roadside antennas installed along another road can be positively prevented.

What is claimed is:

1. A roadside beacon system comprising a plurality of roadside radio-wave antennas for transmitting signals and installed along roads and a plurality of mobile radio-wave antennas mounted on respective vehicles traveling on said roads for receiving said signals,
   wherein at least one roadside antenna, at a position where a structure is extended over a road, is mounted on a lower portion of said structure to transmit and receive in a downward direction a radio wave polarized in a widthwise direction of said road, and at least one roadside antenna is installed near said road to transmit and receive a vertically polarized radio wave in an obliquely downward direction, and
   wherein each mobile antenna mounted on a vehicle transmits and receives a horizontally polarized radio wave in a direction of travel of said vehicle, a vertically polarized radio wave in a direction perpendicular to the direction of travel of said vehicle, and a radio wave polarized in the widthwise direction of said vehicle in an upward direction of said vehicle.

2. A roadside beacon system comprising a plurality of roadside radio-wave antennas for transmitting signals and installed along roads and a plurality of mobile radio-wave antennas mounted on respective vehicles traveling on said roads for receiving said signals,
   wherein at least one roadside antenna, at a position where a structure is extended over a road, is mounted on a lower portion of said structure to transmit and receive in a downward direction a radio wave polarized in a lengthwise direction of said road, and at least one roadside antenna is installed near said road to transmit and receive a horizontally polarized radio wave in an obliquely downward direction, and
   wherein each mobile antenna mounted on a vehicle transmits and receives a horizontally polarized radio wave in a direction perpendicular to a direction of travel of said vehicle, a vertically polarized radio wave in the direction of travel of said vehicle, and a radio wave polarized in the direction of travel of said vehicle in an upward direction of said vehicle.

* * * * *